(12) United States Patent
Di et al.

(10) Patent No.: US 8,873,368 B2
(45) Date of Patent: Oct. 28, 2014

(54) METHOD FOR PROCESSING CHANNEL SWITCHING FAILURE CASE, TERMINAL DEVICE, AND CHANNEL SWITCHING SERVER

(75) Inventors: Peiyun Di, Shenzhen (CN); Zixuan Zou, Shenzhen (CN); Xin Liu, Shenzhen (CN); Yangpo Xu, Shenzhen (CN); Changqi Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 224 days.

(21) Appl. No.: 13/219,261

(22) Filed: Aug. 26, 2011

(65) Prior Publication Data
US 2011/0310726 A1    Dec. 22, 2011

Related U.S. Application Data

(63) Continuation of application No. PCT/CN2009/070577, filed on Feb. 27, 2009.

(51) Int. Cl.
| | | |
|---|---|---|
| H04L 12/26 | (2006.01) | |
| H04N 21/658 | (2011.01) | |
| H04L 29/06 | (2006.01) | |
| H04N 21/266 | (2011.01) | |
| H04N 21/2387 | (2011.01) | |
| H04N 21/438 | (2011.01) | |
| H04N 21/442 | (2011.01) | |
| H04N 21/482 | (2011.01) | |

(52) U.S. Cl.
CPC ........ H04L 63/1416 (2013.01); H04N 21/6581 (2013.01); H04N 21/26616 (2013.01); H04N 21/2387 (2013.01); H04N 21/4384 (2013.01); H04N 21/44209 (2013.01); H04N 21/482 (2013.01)
USPC .......................................................... 370/216

(58) Field of Classification Search
CPC .............................. H04H 20/12; H04H 20/14
USPC .................................................. 370/216, 389
See application file for complete search history.

(56) References Cited

U.S. PATENT DOCUMENTS

| | | | |
|---|---|---|---|
| 2007/0107024 A1 | 5/2007 | Versteeg et al. | |
| 2008/0112324 A1 | 5/2008 | Li et al. | |

(Continued)

FOREIGN PATENT DOCUMENTS

| | | |
|---|---|---|
| CN | 1859281 A | 11/2006 |
| CN | 101316357 | 12/2008 |

(Continued)

OTHER PUBLICATIONS

Search report issued in corresponding Chinese patent application No. 200980157190.5 , dated Febuary 22, 2012, and English translation thereof, total 12 pages.

(Continued)

*Primary Examiner* — Dang Ton
*Assistant Examiner* — Kevin Lee
(74) *Attorney, Agent, or Firm* — Huawei Technologies Co., Ltd.

(57) ABSTRACT

A method for processing a channel switching failure case is disclosed. The method for processing a channel switching failure case is used to provide media services for receiver in unicast and multicast modes and includes: detecting whether a data stream is of failure case after sending a channel switching request; and sending a failure case message and/or a failure case processing message to a channel switching server when a failure case occurs so that the channel switching server may process the failure case. A terminal device and channel switching server are provided so that the channel switching server may recover channel switching services provided for receiver and provide correct services for a user.

4 Claims, 6 Drawing Sheets

(56) References Cited

U.S. PATENT DOCUMENTS

2008/0219204 A1* 9/2008 Lee et al. ............... 370/315
2009/0052450 A1* 2/2009 Mockett ................ 370/390
2010/0036963 A1* 2/2010 Gahm et al. ............ 709/231

FOREIGN PATENT DOCUMENTS

| EP | 1427132 A2 | 6/2004 |
|----|------------|--------|
| WO | WO2007/059679 A1 | 5/2007 |
| WO | WO 2008/100982 A1 | 8/2008 |
| WO | WO2010/096965 A1 | 9/2010 |

OTHER PUBLICATIONS

International Search Report issued in related PCT/CN2009/070577 dated Dec. 10, 2009.

Written Opinion of the International Searching Authority issued in related PCT/CN2009/070577 dated Dec. 10, 2009.

European Patent Office Communication related to the extended report, pursuant to Rule 62 EPC, the supplementary European search report and the European search opinion, related to Application No. 09840633.3-1241, dated (mailed) Jun. 6, 2012, Huawei Tech Co., Ltd (5 pgs.).

Chinese First Office Action mailed Jun. 13, 2012, issued in related Chinese Application No. CN200980157190.5, Huawei Technologies Co., Ltd. (12 pages).

Second Office Action issued in corresponding Chinese patent application No. 200980157190.5, Nov. 13, 2012, and English translation thereof, total 14 pages.

1st office action issued in corresponding European patent application No. 09840633.3, dated Apr. 8, 2013, total 5 pages.

* cited by examiner

METHOD FOR PROCESSING CHANNEL SWITCHING FAILURE CASE, TERMINAL DEVICE, AND CHANNEL SWITCHING SERVER

CROSS-REFERENCE TO RELATED APPLICATIONS

This application is a continuation of International Application No. PCT/CN2009/070577, filed on Feb. 27, 2009, which is hereby incorporated by reference in its entirety.

FIELD OF THE INVENTION

The present invention relates to the field of communication technologies, and in particular, to a method for processing a channel switching failure case, a terminal device, and a channel switching server.

BACKGROUND OF THE INVENTION

Quality of experience (QoE) is used to evaluate the quality of a service from a common user's experience. In an Internet Protocol Television (IPTV) service, the speed of channel switching is an important index affecting the QoE. The channel switching time indicates the time from when a user delivers a channel switching instruction to when the user watches a new channel. After a user sends a channel switching instruction to a client device, a set top box (STB) sends a channel switching request to a server that provides channel switching services (hereinafter referred to as a channel switching server). After receiving the channel switching request, the server responds to the request and provides the services of a new channel for the user in unicast mode. Then after a period of unicast, a multicast server provides the services of the channel for the user. Within the period from the sending of the channel switching instruction to the reception of the information of the new channel, the client device needs to exchange information with the channel switching server. The information exchange takes some time. In addition, data may be corrupted during information exchange and data transmission between the client device and the channel switching server due to packet losses on an Internet Protocol (IP) network.

In the prior art, to shorten channel switching time and ensure channel switching quality, the client first sends a fast channel switching request to the server, and then the server sends the description information of a new channel and the load description information and load information of data streams to the client in unicast mode afterward or simultaneously after receiving the fast channel switching request. After a period of time, the client sends to a multicast server an Internet Group Management Protocol (IGMP) request for joining a multicast group. After the join, the client starts receiving the primary multicast stream. After receiving the multicast stream, the client sends the sequence number (SN) information of the first Real-time Transport Protocol (RTP) packet in the multicast stream to the channel switching server. The channel switching server determines, according to the received SN information, whether to stop the sending of unicast streams.

During the implementation of the present invention, the inventor finds that the prior art has at least the following weaknesses:

In the prior art, the server continues to send the current data stream when the current data stream received by the client is of failure case. That is, the server cannot know the failure case on the client. Thus, the server cannot recover the channel switching services provided for the client and the client cannot normally play the channel corresponding to the current data stream. That is, the QoE on the client is poor.

SUMMARY OF THE INVENTION

Embodiments of the present invention provide a method for processing a channel switching failure case, a terminal device, and a channel switching server to recover the channel switching services provided for receiver so that the QoE on the receiver is better.

According to an aspect of the present invention, a method for processing a channel switching failure case is provided. The method is applied to provide media, in unicast and multicast modes, services for a user and includes:

detecting whether a failure case occurs in a data stream after a channel switching request is sent;

sending a failure case message and/or a failure case processing message to a channel switching server when a failure case occurs in the data stream, so that the channel switching server processes the failure case.

According to another aspect of the present invention, a method for processing a channel switching failure case is provided. The method is applied to provide, in unicast and multicast modes, media services for a user and includes:

receiving a failure case message and/or a failure case processing message sent by a terminal device;

parsing the failure case message;

processing the failure case according to the parsed message.

According to another aspect, a terminal device is provided. The terminal device is configured to provide, in unicast and multicast modes, media services for a user and includes:

a failure case detecting module, configured to detect whether a failure case occurs; and a failure case processing module, configured to send a failure case message and/or a failure case processing message to a channel switching server when the failure case detecting module detects a failure case, so that the channel switching server processes the failure case.

According to another aspect of the present invention, a channel switching server is provided. The channel switching server is applied to provide, in unicast and multicast modes, media services for a user and includes:

a message processing module, configured to receive a failure case message and/or a failure case processing message sent by a terminal device and parse the message; and a sending module, configured to perform corresponding processing according to the message parsed by the message processing module.

With the method for processing a channel switching failure case, terminal device, and channel switching server, a failure case message and/or a failure case processing message is sent to the channel switching server when a failure case occurs so that the channel switching server may recover the channel switching services provided for a user and further provide correct services for a client.

BRIEF DESCRIPTION OF THE DRAWINGS

To make the technical solution under the present invention or in the prior art clearer, the accompanying drawings for illustrating the embodiments of the present invention or the prior art are outlined below. Obviously, the accompanying drawings are only some embodiments of the present invention, and those skilled in the art can derive other drawings from such accompanying drawings without creative work.

DETAILED DESCRIPTION OF THE EMBODIMENTS

The technical solution of the present invention is described hereinafter clearly and completely with reference to the accompanying drawings. It is evident that the described embodiments are only some rather than all embodiments of the present invention and the present invention is not limited to such embodiments. Other embodiments that those skilled in the art derive from the embodiments of the present invention also fall within the protection scope of the present invention.

Figure 1:
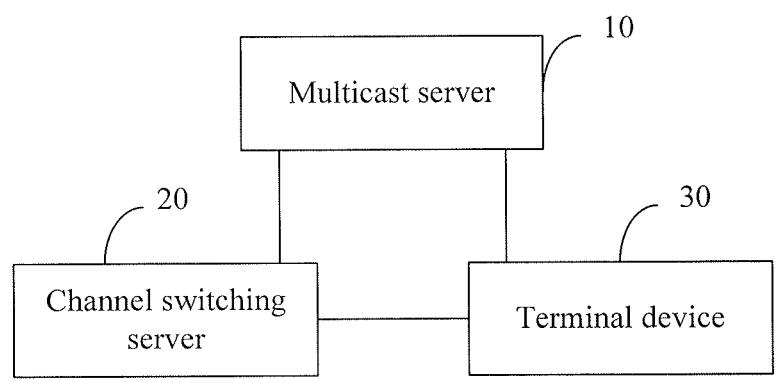
FIG. 1 is a schematic diagram showing an application environment of a terminal device according to an embodiment of the present invention.

FIG. 1 is a schematic diagram showing an application environment of a terminal device according to an embodiment of the present invention. In this embodiment, a multicast server 10 is connected to a channel switching server 20 and a terminal device 30 respectively. The channel switching server 20 is configured to send a unicast stream of a new channel to the terminal device 30 according to the channel switching request sent by the terminal device 30. The multicast server 10 is configured to: receive a request, sent by the terminal device 30, for joining a multicast group in a period of time after the terminal device 30 receives the unicast stream sent by the channel switching server 20, send a multicast stream to the terminal device 30, and send the multicast stream to the channel switching server 20 for storage. In this embodiment, the terminal device 30 may be an STB.

Figure 2:
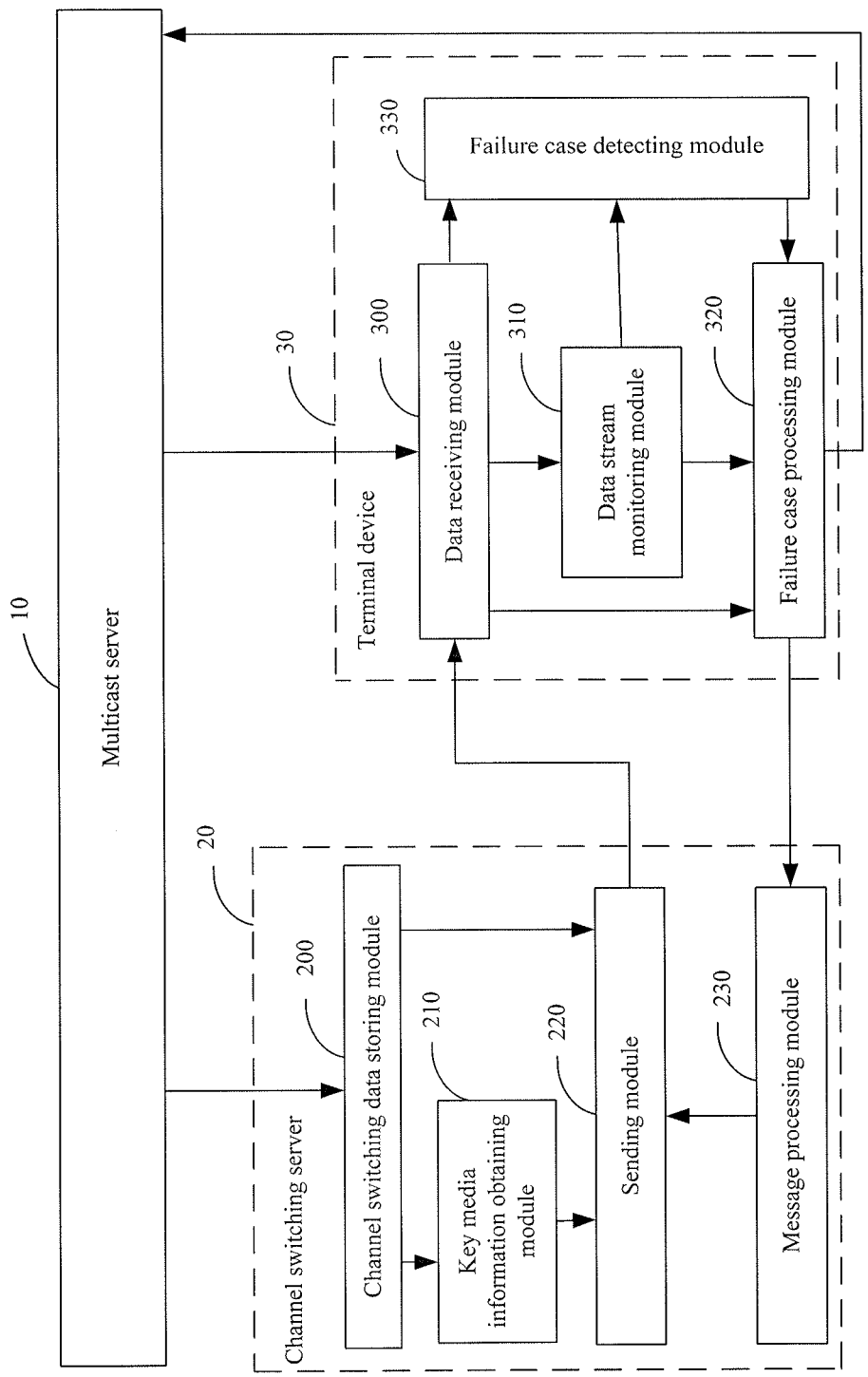
FIG. 2 is a schematic diagram showing structures of a terminal device and a channel switching server according to an embodiment of the present invention.

FIG. 2 shows structures of a terminal device and a channel switching server according to an embodiment of the present invention. In this embodiment, the terminal device 30 receives unicast streams sent by the channel switching server 20. The channel switching server 20 includes a channel switching data storing module 200, a key media information obtaining module 210, a sending module 220, and a message processing module 230. The terminal device 30 includes a data receiving module 300, a data stream monitoring module 310, a failure case processing module 320, and a failure case detecting module 330.

In this embodiment, the data receiving module 300 is configured to receive multicast streams and/or unicast streams satisfying the requirements of a user for playing the channels. In this embodiment, after performing channel switching, the terminal device 30 first receives a unicast stream sent by the channel switching server 20. After receiving the unicast stream for a period of time, the terminal device 30 receives a multicast stream sent by the multicast server 10 while continuing to receive the unicast stream until the unicast stream synchronizes with the multicast stream. After another period of time, that is, after the unicast stream synchronizes with the multicast streams, the channel switching server 20 stops sending the unicast stream of the channel. In this case, the terminal device 30 receives the multicast stream sent by the multicast server 10 but the channel switching server 20 continues to send some data of other channel-related services. For example, when the multicast stream sent by the multicast server 10 for a channel include incorrect data stream, the channel switching server 20 may be instructed to resend a part of data streams related to the channel.

The data stream monitoring module 310 is configured to monitor the information of the data received by the data receiving module 300. That is, the data stream monitoring module 310 monitors whether the data streams received by the data receiving module 300 are unicast streams or multicast streams and monitors the bitrate of the receive data streams. The current stream may be a unicast stream, a unicast stream and a multicast stream, or a multicast stream.

In this embodiment, the failure case detecting module 330 is configured to detect, according to the information of the data monitored by the data stream monitoring module 310, whether the data streams received by the data receiving module 300 are of failure case, after the terminal device 30 sends a channel switching request.

In this embodiment, the failure case detecting module 330 is further configured to send the information, which is detected by the data stream monitoring module 310 and indicates that the data receiving module 300 does not get a unicast stream within a preset time, to the failure case processing module 320. The failure case processing module 320 is further configured to gives up obtaining data streams from the channel switching server 20 after receiving from the failure case processing module 320 the information indicating that the data receiving module 300 does not receive any unicast stream within the preset time. That is, the failure case processing module 320 sends a failure case message to the channel switching server 20, and chooses to join the multicast group. The failure case message includes the information indicating that no unicast stream is received within the preset time. A failure case processing message may also be sent to the channel switching server 20. In this embodiment, the failure case processing message includes the information for stopping or resending the current stream. The failure case information and a failure case processing message may be also sent to the channel switching server 20. That is, when a failure case occurs, three processing modes are provided:

In this embodiment, when the data stream monitoring module 310 monitors that the data receiving module 300 receives a unicast stream, the failure case detecting module 330 detects whether the key media information in the data stream received by the data receiving module 300 is incorrect or lost or whether there is an error that may cause the terminal device 30 to fail to normally play the corresponding channel of the unicast stream. The error may be about whether a packet or data packet in the data stream is lost or whether a data in the I frame in the data stream is corrupted or lost.

When detecting one or more of the foregoing failure cases, the failure case detecting module 330 instructs the failure case processing module 320 to process the failure case(s).

In this embodiment, a data stream in the H.264/TS format is taken as an example for illustration. After the terminal device 30 sends a channel switching request to the channel switching server 20, the channel switching server 20 sends the key media information related to channel switching and the data stream information to the terminal device 30 through a Real-time Transport Control Protocol (RTCP) packet, or encapsulates the key media information related to channel switching and the data stream information into a data packet and send the data packet to the terminal device 30. The failure case detecting module 330 detects whether the packet or data packet in the data streams currently received by the data receiving module 300 is lost, or whether the key media information in the data stream is incorrect or lost, or whether the data in the I frame in the data stream is corrupted or lost. If the packet or data packet is lost, the terminal device 30 cannot identify the data stream sent by the channel switching server 20 and thus cannot play the channel. If the key media information such as the video sequence parameter set and the video image parameter set is lost or incorrect, the terminal device 30 cannot decode the received data stream and thus cannot play the channel. If the I frame in the data stream is corrupted or lost, the terminal device 30 cannot play the channel normally. That is, the screen tearing occurs on the played channel or the data stream cannot be decoded.

The failure case processing module 320 is configured to give up obtaining streams from the channel switching server 20 when the failure case detecting module 330 detects a failure case in a unicast stream received by the data receiving module 300. That is, the failure case processing module 320 sends to the channel switching server 20 the failure case information indicating that the key media information in the unicast stream is incorrect or lost or that the data of the random access point in the unicast stream is corrupted or lost, and chooses to join the multicast group. A failure case processing message may also be sent to the channel switching server 20. The failure case processing module 320 may also send the information indicating that the key media information in the unicast stream is incorrect or lost or that the data of the random access point in the unicast stream is corrupted or lost and the corresponding failure case processing message to the channel switching server 20. The failure case processing message includes the information for stopping or resending the unicast stream.

In this embodiment, the failure case processing module 320 is further configured to send a failure case message, or a failure case processing message, or a failure case message and a failure case processing message to the channel switching server 20 when the failure case detecting module 330 detects repeated data streams beyond the preset condition in the received unicast and multicast streams. The failure case message includes the information indicating that there are repeated data streams beyond the preset condition in the received unicast and multicast streams. In this embodiment, the failure case processing message includes the information for stopping the current data stream. The preset condition may be a repeated data volume or a repetition duration. In this embodiment, if there are repeated data streams in the unicast and multicast streams, data packets may be lost when network bandwidth resources are insufficient or data may overflow when the storage resources of the terminal device 30 are insufficient. That is, it is regarded that a failure case occurs when there are repeated data streams in the unicast and multicast streams.

In this embodiment, the channel information includes a synchronization source (SSRC) of a channel.

In this embodiment, the failure case detecting module 330 is further configured to send a failure case message to the channel switching server 20 when the data stream monitoring module 310 detects that the received unicast stream is asynchronous with the received multicast stream after the sending of unicast streams is stopped. The failure case message includes the information indicating that the received unicast stream is asynchronous with the received multicast stream after the sending of unicast streams is stopped. A failure case processing message may also be sent to the channel switching server 20. The failure case processing message includes a synchronization processing message. The synchronization processing message includes the information for continuing to send data until the sent data is synchronous with the received multicast or the information indicating that no data synchronized with the received multicast needs to be sent. The synchronization processing message and the failure case message may also be sent to the channel switching server 20. In this embodiment, if the unicast stream previously received by the data receiving module 300 is asynchronous with the currently received multicast stream, it indicates that some data received by the data receiving module 300 is lost. This is regarded as a failure case and affects the QoE of a user.

In this embodiment, the failure case detecting module 330 is further configured to send a failure case message, or a failure case processing message, or a failure case message and a failure case processing message to the channel switching server 20 when the data stream monitoring module 310 detects that no multicast stream is received within another preset time. The failure case message includes the information indicating that no multicast stream is received within another preset time. In this embodiment, the failure case processing message includes the information for continuing to send the data streams of the current channel. If the receiving of unicast streams is stopped but no multicast stream is received, the display may be paused after a period of time.

In this embodiment, the channel switching data storing module 200 is configured to store multicast streams sent by the multicast server 10 and the key media information in data streams. The key media information obtaining module 210 is configured to obtain the description information of the key media information in the multicast streams stored by the channel switching data storing module 200. In this embodiment, the description information of the key media information may include but is not limited to: the location of the random access point for the channel of the media and the location of the description information required for normally playing a channel. The location of the random access point for the channel of the media may be the sequence number (SN) of the start packet of the data stream to be sent during random access. The description information required for normally playing a channel may be all the data identifications (IDs) and data stream types of the channel, parameter information required for parsing data streams, or information required for synchronizing various types of data in the channel.

The message processing module 230 is configured to: receive a failure case message and/or a failure case processing message sent by the terminal device 30 and parse the failure case message and/or the failure case processing message.

In this embodiment, the sending module 220 is configured to stop sending or resend the current data stream to the terminal device 30 when the message parsed by the message processing module 230 includes a failure case message and the failure case message includes the information indicating that no unicast stream is received within a preset time. In this embodiment, if the failure case message includes the information indicating that the key media information in the unicast stream is incorrect or lost or that the data of the random access point in the data stream is corrupted or lost, the sending module 220 is further configured to stop sending or resend the current stream to the terminal device 30. In this embodiment, if the failure case message includes the information indicating that there are repeated data streams beyond the preset condition in the received unicast and multicast streams, the sending module 220 is further configured to stop sending the current data stream to the terminal device 30; if the failure case message includes the information indicating that the received unicast stream is asynchronous with the received multicast stream after the sending of unicast data streams is stopped, the sending module 220 is further configured to send the current data stream synchronized with the multicast stream to the terminal device 30. If the failure case message includes the information indicating that no multicast stream is received within another preset time, the sending module 220 is further configured to continue to send the data streams of the current channel to the terminal device 30.

In this embodiment, the sending module 220 is further configured to stop sending the current stream to the terminal device 30 when the message parsed by the message processing module 230 includes a failure case processing message and the failure case processing message includes the information for stopping the current stream, or configured to resend the current stream to the terminal device 30 when the failure case processing message includes the information for resending the current data stream. In this embodiment, when the failure case processing message includes a synchronization processing message, the sending module 220 sends the current data stream synchronized with the multicast stream to the terminal device 30 according to the information for continuing to send data until the sent data is synchronous with the received multicast in the synchronization processing message, or does not send the current data stream synchronized with the multicast stream to the terminal device 30 according to the information indicating that no data synchronized with the received multicast needs to be sent in the synchronization processing message. In this embodiment, when the failure case processing message includes the information for continuing to send the data streams of the current channel, the sending module 220 is further configured to continue to send the data streams of the current channel to the terminal device 30.

In this embodiment, the sending module 220 is further configured to stop sending or resend the current data stream to the terminal device 30 when the message parsed by the message processing module 230 includes the failure case message and failure case processing message, the failure message includes the information indicating that no unicast stream is received within a preset time, and the failure case processing message includes the information for stopping or resending the current stream. In this embodiment, if the failure case message includes the information indicating that the description information of the key media information in the unicast stream is incorrect or lost or that the data of the random access point in the data stream is corrupted or lost and the failure case processing message includes the information for stopping or resending the current data stream, the sending module 220 is further configured to stop sending or resend the current data stream to the terminal device 30.

In this embodiment, if the failure case message includes the information indicating that there are repeated data streams beyond the preset condition in the received unicast and multicast streams and the failure case processing message includes the information for stopping the current data stream, the sending module 220 is further configured to stop sending the current data stream to the terminal device 30. If the failure case message includes the information indicating that the received unicast stream is asynchronous with the currently received multicast stream after the sending of unicast streams is stopped and the failure case processing message includes a synchronization processing message, the sending module 220 is configured to send the current data stream synchronized with the multicast stream to the terminal device 30 when the synchronization processing message includes the information for continuing to send data until the sent data is synchronous with the received multicast, or does not send the current data stream synchronized with the multicast stream to the terminal device 30 when the synchronization processing message includes the information indicating that no data synchronized with the received multicast needs to be sent. If the failure case message includes the information indicating that no multicast stream is received within another preset time and the failure case processing message includes the information for continuing to send the data streams of the current channel, the sending module 220 is further configured to continue to send the data streams of the current channel to the terminal device 30. In this embodiment, when it is required to send the current data stream to the terminal device 30, the sending module 220 obtains the description information of the key media information of the current data stream from the key media information obtaining module 210, and obtains the key information of the current data stream and the data stream information of the random access point from the channel switching data storing module 200 according to the description information of the key media information, and sends the obtained information to the terminal device.

The terminal device provided in the embodiments of the present invention may send a failure case message and/or a failure case processing message to the channel switching server for each detected failure case. In this way, the channel switching server may recover the channel switching services provided for a user, provide correct services for a client, and improve the quality of the channel switching services recovered for a user.

Figure 3:
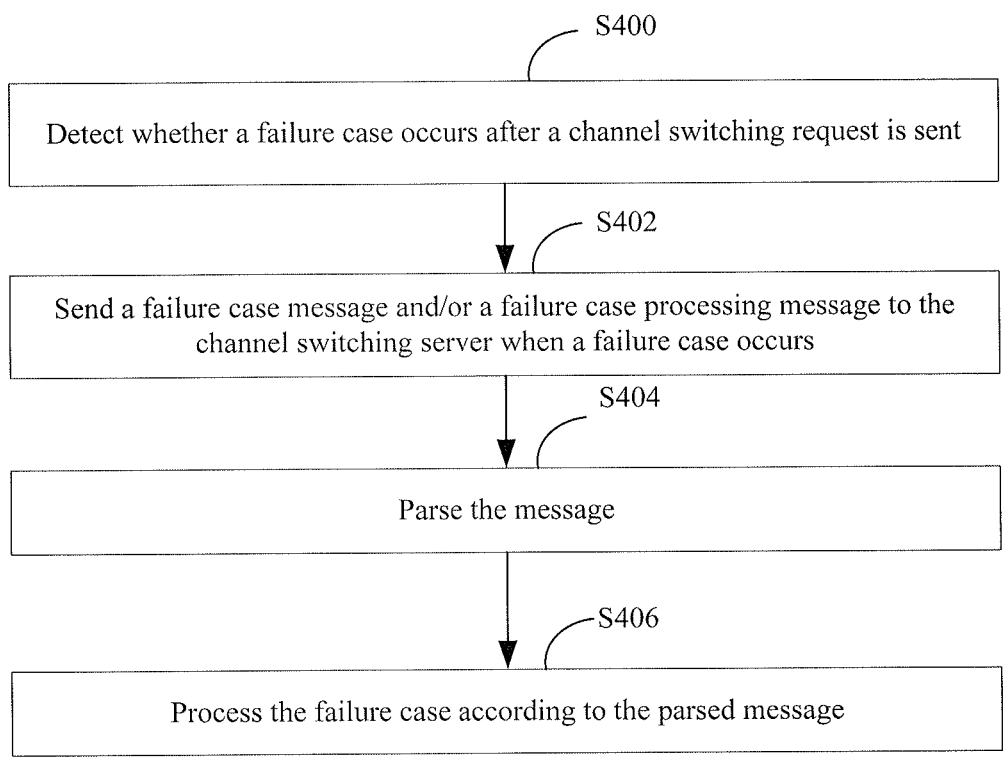
FIG. 3 is a general flowchart of a failure case processing method for channel switching according to an embodiment of the present invention.

FIG. 3 is a general flowchart of a failure case processing method for channel switching according to an embodiment of the present invention. The method is applied to provide, in unicast and multicast modes, media services for a user and includes the following steps:

Step S400 in this embodiment: Detecting whether a failure case occurs after a channel switching request is sent. In this embodiment, the process of detecting whether a failure case occurs includes:

detecting whether a unicast stream is received within a preset time; or detecting whether the key media information in the unicast stream is incorrect or lost, or whether the data of the random access point in the data stream is corrupted or lost; or detecting whether there are repeated data streams beyond the preset condition in the received unicast and multicast streams; or detecting whether the received unicast stream is synchronous with the currently received multicast stream after the sending of the unicast streams is stopped; or detecting whether the receiving of unicast data streams is stopped but no multicast stream is received within another preset time.

Step S402: Sending a failure case message and/or a failure case processing message to the channel switching server when a failure case occurs. In this embodiment, the failure case message, or the failure case processing message, or the failure case message and failure case processing message may be sent to the channel switching server. That is, three processing modes are provided:

sending only the failure case message to the channel switching server so that the channel switching server may perform corresponding processing according to the failure case message; or sending only the failure case processing message to the channel switching server so that the channel switching server may process, according to the failure processing message, channel data streams after the terminal sends a channel switching request; or sending the failure case message and the failure case processing message to the channel switching server so that the channel switching server may perform corresponding processing according to the failure case message and failure case processing message.

Step S404: Parsing the message.

Step S406: Processing the failure case according to the parsed message.

Figure 4:
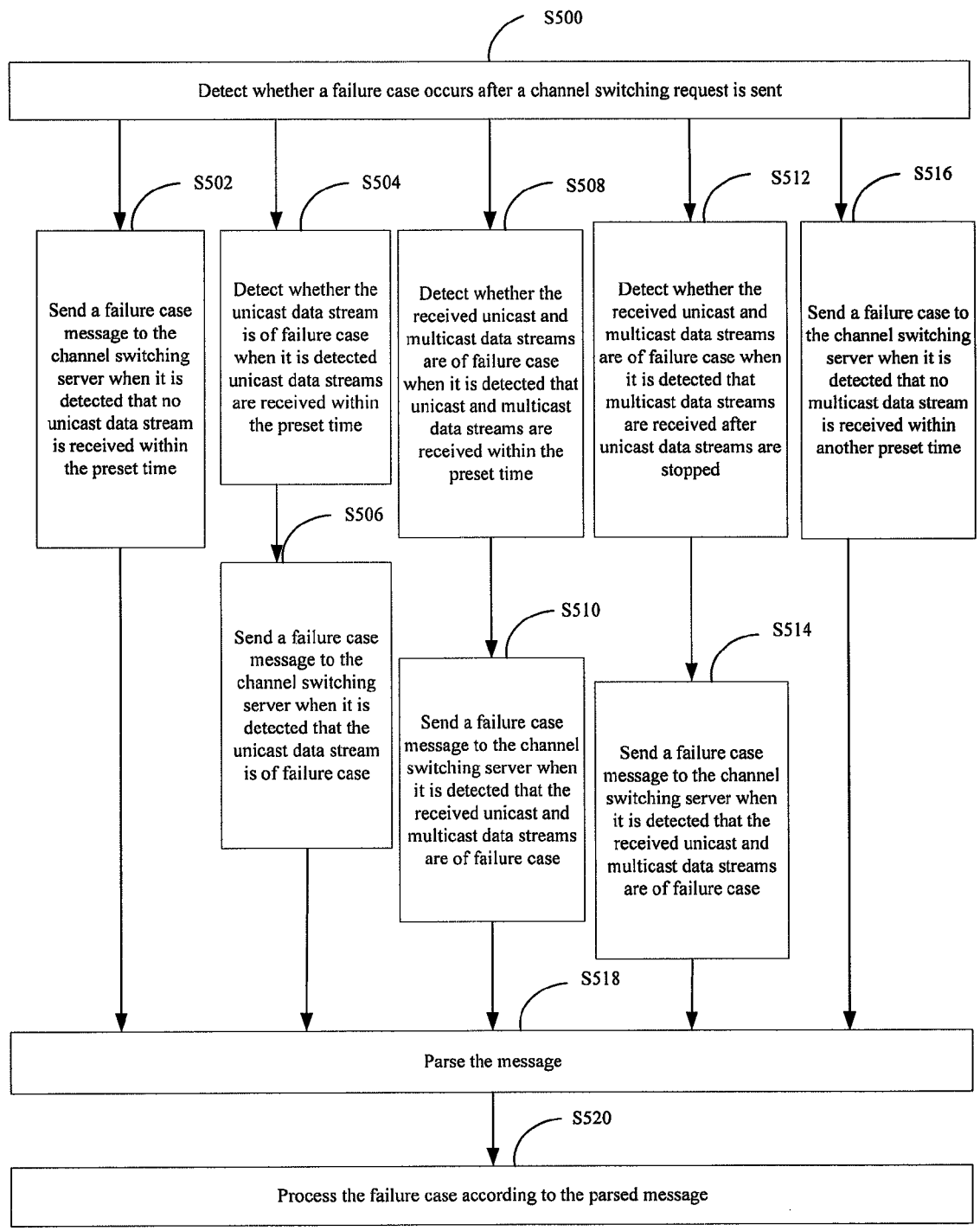
FIG. 4 is a first detailed flowchart of a failure case processing method for channel switching according to an embodiment of the present invention.

FIG. 4 is a first detailed flowchart of a failure case processing method for channel switching according to an embodiment of the present invention. In this embodiment, the method is applied when a terminal device sends only a failure case message.

Step S500 in this embodiment: Detecting whether a failure case occurs after sending a channel switching request. In this embodiment, step S502 is performed when it is detected that no unicast stream is received within a preset time; step S504 is performed when it is detected that unicast streams are received; step S508 is performed when it is detected that unicast and multicast streams are received; step S512 is performed when it is detected that the receiving of unicast streams is stopped and multicast streams are received within the preset time; Step S516 is performed when it is detected that the receiving of unicast streams is stopped but no multicast stream is received within the preset time.

Step S502: Sending a failure case message to the channel switching server when it is detected that no unicast stream is received within the preset time. The failure case message includes the information indicating that no unicast stream is received within the preset time. After step S502 is complete, step S518 is performed.

Step S504: Detecting whether the unicast stream is of failure. In this embodiment, the process of detecting whether the unicast stream is of failure includes: detecting whether the key media information in the unicast stream is incorrect or lost; or detecting whether the data of the random access point in the data stream is corrupted or lost.

Step S506: Sending a failure case message to the channel switching server when it is detected that the unicast stream is of failure case. The failure case message includes the information indicating that the key media information in the unicast stream is incorrect or lost or that the data of the random access point in the data stream is corrupted or lost.

After step S506 is complete, step S518 is performed.

Step S508: Detecting whether the received unicast and multicast streams are of failure case when it is detected that unicast and multicast streams are received. That is, detect whether there are repeated data streams beyond the preset condition in the received unicast and multicast streams.

Step S510: Sending a failure case message to the channel switching server when it is detected that the received unicast and multicast streams are of failure case, that is, when it is detected that there are repeated data streams beyond the preset condition in the received unicast and multicast streams. The failure case message includes the information indicating that there are repeated data streams beyond the preset condition in the received unicast and multicast streams. After step S510 is complete, step S518 is performed.

Step S512: Detecting whether the received unicast and multicast streams are of failure when it is detected that multicast streams are received after the sending of unicast streams is stopped. That is, detect whether the received unicast stream is synchronous with the currently received multicast stream after the sending of unicast streams is stopped.

Step S514: Sending a failure case message to the channel switching server when it is detected that the received unicast and multicast streams are of failure, that is, when it is detected that the previously received unicast stream is asynchronous with the currently received multicast stream after the sending of unicast streams is stopped. The failure case message includes the information indicating that the received unicast stream is asynchronous with the currently received multicast stream after the sending of unicast streams is stopped. After step S514 is complete, step S518 is performed.

Step S516: Sending a failure case message to the channel switching server when it is detected that no multicast stream is received within another preset time. The failure case message includes the information indicating that no multicast stream is received within another preset time. After step S516 is complete, step S518 is performed.

Step S518: Parsing the message.

Step S520: Processing the failure case according to the parsed message.

In this embodiment, this step includes:

stopping sending or resending the current stream to the terminal device when the parsed message includes a failure case message and the failure case message includes the information indicating that no unicast stream is received within the preset time;

stopping sending or resending the current stream to the terminal device when the failure case message includes the information indicating that the key media information in the unicast stream is incorrect or lost or that the data of the random access point in the unicast stream is corrupted or lost;

stopping sending the current stream to the terminal device when the failure case message includes the information indicating that there are repeated data streams beyond the preset condition in the received unicast and multicast streams;

sending the current data stream synchronized with the multicast stream to the terminal device when the failure case message includes the information indicating that the received unicast stream is asynchronous with the currently received multicast stream after the sending of unicast streams is stopped; and continuing to send the processing message for the data streams of the current channel to the terminal device when the failure case message includes the information indicating that no multicast stream is received within another preset time.

In this embodiment, when data streams need to be sent to the terminal device, the key media information obtaining module 210 obtains the description information of the key media information of the current stream and the key information of the current stream and the data stream information of the random access point according to the description information of the key media information, and sends the obtained information to the terminal device.

Figure 5:
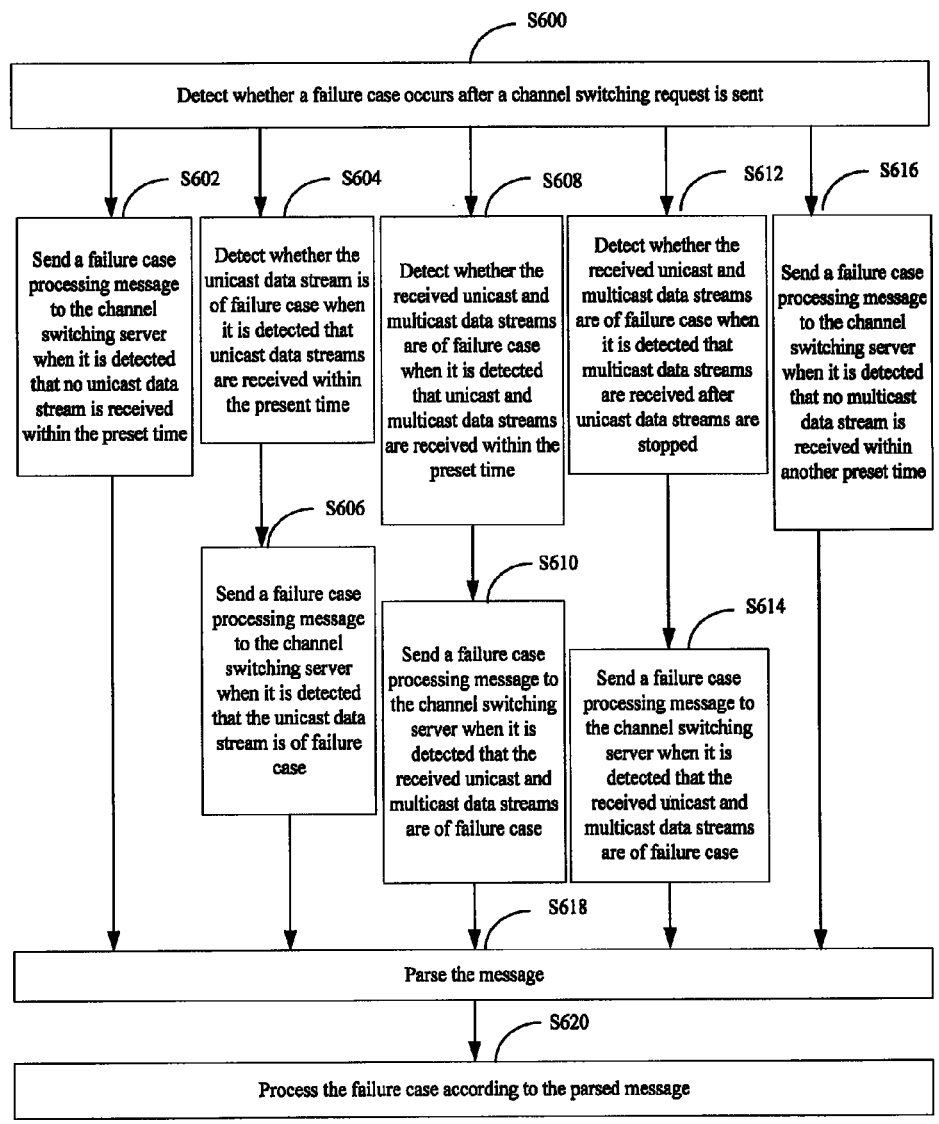
FIG. 5 is a second detailed flowchart of a failure case processing method for channel switching according to an embodiment of the present invention.

FIG. 5 is a second detailed flowchart of a failure case processing method for channel switching according to an embodiment of the present invention. In this embodiment, the method is applied when a terminal device sends only a failure case processing message.

Step S600 in this embodiment: Detecting whether a failure case occurs after sending a channel switching request.

Step S602: Sending a failure case processing message to the channel switching server when it is detected that no unicast stream is received within the preset time. The failure case processing message includes the information for stopping or resending the current stream. After step S602 is complete, step S618 is performed.

Step S604: Detecting whether the unicast stream is of failure. In this embodiment, this step includes: detecting whether the key media information in the unicast stream is incorrect or lost; or detecting whether the data of the random access point in the data stream is corrupted or lost.

Step S606: Sending a failure case processing message to the channel switching server when it is detected that the unicast stream is of failure. The failure case processing message includes the information for stopping or resending the current data stream.

After step S606 is complete, step S618 is performed.

Step S608: Detecting whether the received unicast and multicast streams are of failure case when it is detected that unicast and multicast streams are received. That is, detect whether there are repeated data streams beyond the preset condition in the received unicast and multicast streams.

Step S610: Sending a failure case processing message to the channel switching server when it is detected that the received unicast and multicast streams are of failure, that is, when it is detected that there are repeated data streams beyond the preset condition in the received unicast and multicast streams. The failure case processing message includes the information for stopping the current data stream. After step S610 is complete, step S618 is performed.

Step S612: Detecting whether the received unicast and multicast streams are of failure when it is detected that multicast streams are received after the sending of unicast streams is stopped. That is, detect whether the received unicast stream is synchronous with the currently received multicast stream after the sending of unicast streams is stopped.

Step S614: Sending a failure case processing message to the channel switching server when it is detected that the received unicast and multicast streams are of failure, that is, when it is detected that the received unicast stream is asynchronous with the currently received multicast stream after the sending of unicast streams is stopped. The failure case processing message includes a synchronization processing message and the synchronization processing message includes the information for continuing to send data until the sent data is synchronous with the received multicast or the information indicating that no data synchronized with the received multicast needs to be sent. After step S614 is complete, step S618 is performed.

Step S616: Sending a failure case processing message to the channel switching server when it is detected that no multicast stream is received within another preset time. The failure case processing message includes the information for continuing to send the data streams of the current channel. After step S616 is complete, step S618 is performed.

Step S618: Parsing the message.

Step S620: Processing the failure case according to the parsed message.

In this embodiment, when the parsed message includes a failure case processing message, this step includes:

stopping sending the current data stream to the terminal device when the failure case processing message includes the information for stopping the current stream;

resending the current data stream to the terminal device when the failure case processing message includes the information for resending the current stream;

sending the current data stream synchronized with the multicast stream to the terminal device when the failure case processing message includes a synchronization processing message and the synchronization processing message includes the information for continuing to send data until the sent data is synchronous with the received multicast data; or not sending the current data stream synchronized with the multicast stream to the terminal device when the synchronization processing message includes the information indicating that no data synchronized with the received multicast data needs to be sent; and continuing to send the processing message for the data streams of the current channel to the terminal device when the failure case processing message includes the information for continuing to send the data streams of the current channel.

In this embodiment, when data streams need to be sent to the terminal device, the key media information obtaining module 210 obtains the description information of the key media information of the current data stream and the key information of the current data stream and the data stream information of the random access point according to the description information of the key media information, and sends the obtained information to the terminal device.

Figure 6:
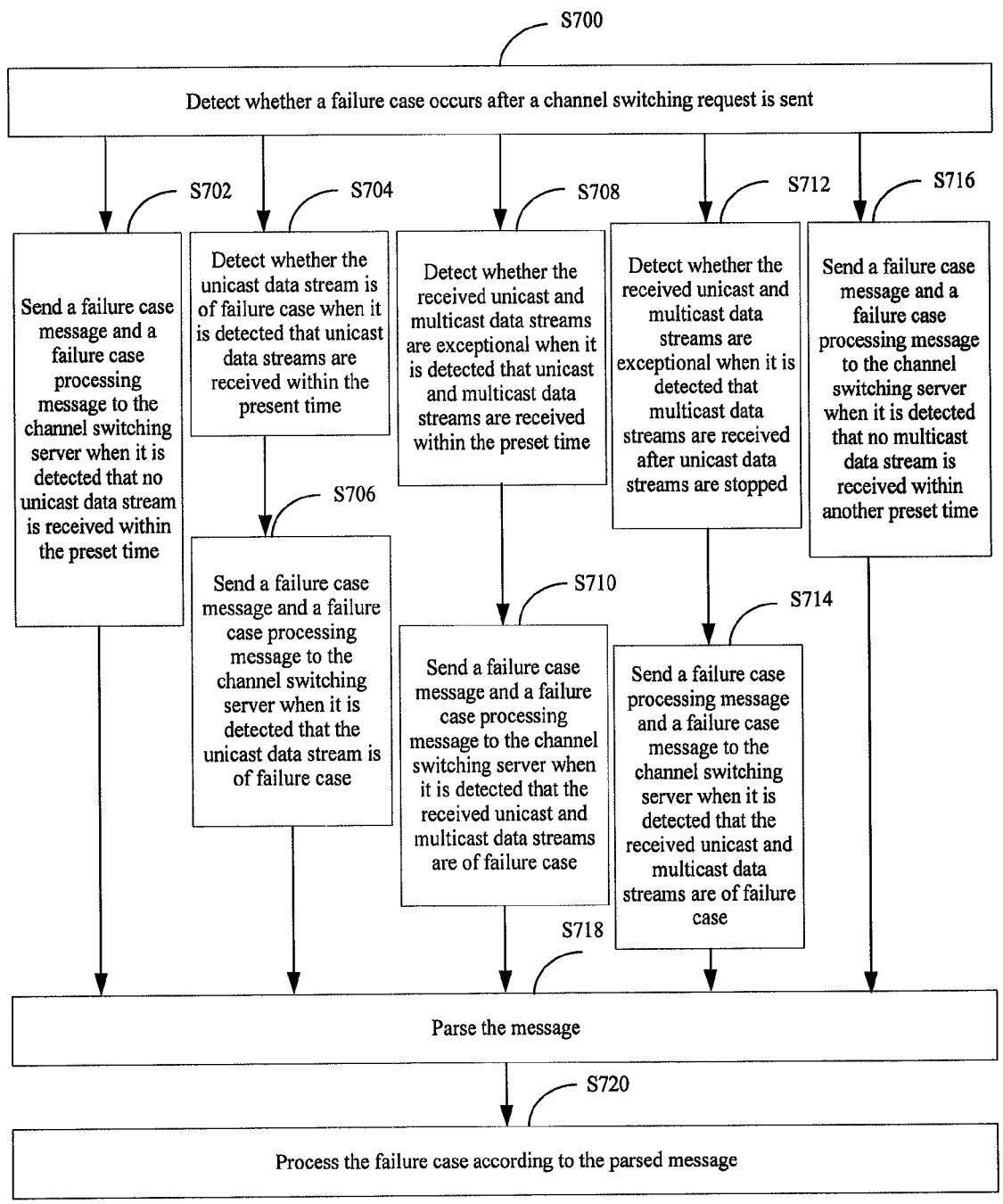
FIG. 6 is a third detailed flowchart of a failure case processing method for channel switching according to an embodiment of the present invention.

FIG. 6 is a third detailed flowchart of a failure case processing method for channel switching according to an embodiment of the present invention. In this embodiment, the method is applied when a terminal device sends both a failure case message and a failure case processing message.

Step S700 in this embodiment: Detecting whether a failure case occurs after sending a channel switching request.

Step S702: Sending a failure case message and a failure case processing message to the channel switching server when it is detected that no unicast stream is received within a preset time. The failure case message includes the information indicating that no unicast stream is received within the preset time; and the failure case processing message includes the information for stopping or resending the current data stream. After step S702 is complete, step S718 is performed.

Step S704: Detecting whether the unicast stream is of failure case. In this embodiment, this step includes: detecting whether the key media information in the unicast stream is incorrect or lost; or detecting whether the data of the random access point in the data stream is corrupted or lost.

Step S706: Sending a failure case message and a failure case processing message to the channel switching server when it is detected that the unicast stream is of failure case. The failure case message includes the information indicating that the key media information in the unicast stream is incorrect or lost or that the data of the random access point in the data stream is corrupted or lost; and the failure case processing message includes the information for stopping or resending the current data stream.

After step S706 is complete, step S718 is performed.

Step S708: Detecting whether the received unicast and multicast streams are of failure when it is detected that unicast and multicast streams are received. That is, detect whether there are repeated data streams beyond the preset condition in the received unicast and multicast streams.

Step S710: Sending a failure case message and a failure case processing message to the channel switching server when it is detected that the received unicast and multicast streams are of failure case, that is, when it is detected that there are repeated data streams beyond the preset condition in the received unicast and multicast streams. The failure case message includes the information indicating that there are repeated data streams beyond the preset condition in the received unicast and multicast streams; and the failure case processing message includes the information for stopping the current data stream. After step S710 is complete, step S718 is performed.

Step S712: Detecting whether the received unicast and multicast streams are of failure when it is detected that multicast streams are received after the sending of unicast streams is stopped. That is, detect whether the received unicast stream is synchronous with the currently received multicast stream after the sending of unicast streams is stopped.

Step S714: Sending a failure case processing message and a failure case message to the channel switching server when it is detected that the received unicast and multicast streams are of failure, that is, when it is detected that the received unicast stream is asynchronous with the currently received multicast stream after the sending of unicast streams is stopped. The failure case message includes the information indicating that the received unicast stream is asynchronous with the currently received multicast stream after the sending of unicast streams is stopped; and the failure case processing message includes a synchronization processing message and the synchronization processing message includes the information for continuing to send data until the sent data is synchronous with the received multicast or the information indicating that no data synchronized with the received multicast needs to be sent. After step S714 is complete, step S718 is performed.

Step S716: Sending a failure case message and a failure case processing message to the channel switching server when it is detected that no multicast stream is received within another preset time. The failure case message includes the information indicating that no multicast stream is received within another preset time; and the failure case processing message includes the information for continuing to send the data streams of the current channel. After step S716 is complete, step S718 is performed.

Step S718: Parsing the message.

Step S720: Processing the failure case according to the parsed message.

When the parsed message includes a failure case message and a failure case processing message, this step includes:

stopping sending or resending the current data stream to the terminal device when the failure case message includes the information indicating that no unicast stream is received within the preset time and the failure case processing message includes the information for stopping or resending the current data stream;

stopping sending or resending the current data stream to the terminal device when the failure case message includes the information indicating that the description information of the key media information in the unicast stream is incorrect or lost and the failure case processing message includes the information for stopping or resending the current data stream;

stopping sending the current data stream to the terminal device when the failure case message includes the information indicating that there are repeated data streams beyond the preset condition in the received unicast and multicast streams and the failure case processing message includes the information for stopping the current data stream;

sending the current data stream synchronized with the multicast stream to the terminal device when the failure case message includes the information indicating that the received unicast stream is asynchronous with the currently received multicast stream after the sending of unicast streams is stopped, the failure case processing message includes a synchronization processing message, and the synchronization processing message includes the information for continuing to send data until the sent data is synchronous with the received data; or not sending the current data stream synchronized with the multicast stream to the terminal device when the synchronization processing message includes the information indicating that no data synchronized with the received multicast needs to be sent; and continuing to send the data streams of the current channel to the terminal device when the failure case message includes the information indicating that no multicast stream is received within another preset time and the failure case processing message includes the information for continuing to send the data streams of the current channel.

In this embodiment, when data streams need to be sent to the terminal device, the key media information obtaining module 210 obtains the description information of the key media information of the current data stream and the key information of the current data stream and the data stream information of the random access point according to the description information of the key media information, and sends the obtained information to the terminal device.

The failure case processing method for channel switching in the embodiments of the present invention enables a terminal device to send a failure case message and/or a failure case processing message to a channel switching server when a failure case occurs so that the channel switching server may recover the channel switching services provided for a user, provide correct services for a client, and improve the quality of the channel switching services recovered for a user.

Those skilled in the art may understand that all or part of the steps in the preceding embodiments may be completed by hardware following instructions of a program. The program may be stored in a computer-readable storage medium such as a magnetic disk, a compact disk, a read-only memory (ROM), or a random access memory (RAM). When the program is performed, the steps of the foregoing embodiments are performed.

Although the invention has been described through some exemplary embodiments, the invention is not limited to such embodiments. It is apparent that those skilled in the art may make various modifications and variations to the invention without departing from the spirit and scope of the invention.

What is claimed is:

1. A method for processing a channel switching failure case, wherein the method is applied to provide media service to a user terminal through unicast and multicast, and comprises:

receiving a failure case message or a failure case processing message from a terminal device;

parsing the failure case message or the failure case processing message;

processing the failure case according to the parsed failure case message or the parsed failure case processing message, wherein the processing the failure case according to the parsed failure case message or the parsed failure case processing message comprises:

stopping sending current data stream to the terminal device, when the failure case message comprises information indicating that there are repeated data streams beyond a preset condition in received unicast and multicast streams; and sending the current data stream synchronized with the multicast stream to the terminal device, when the failure case message comprises information indicating that the received unicast stream is asynchronous with the currently received multicast stream after the sending of unicast streams is stopped, or no data synchronized with the currently received multicast stream needs to be sent to the terminal device.

2. A method for processing a channel switching failure case, wherein the method is applied to provide media service to a user terminal through unicast and multicast, and comprises:

receiving a failure case message or a failure case processing message from a terminal device;

parsing the failure case message or the failure case processing message;

processing the failure case according to the parsed failure case message or the parsed failure case processing message, wherein the processing the failure case according to the parsed failure case message or the parsed failure case processing message comprises:
stopping sending a current data stream to the terminal device, when the failure case processing message comprises the information for stopping the current data stream;
sending the current data stream synchronized with a multicast stream to the terminal device, when the failure case processing message comprises a synchronization processing message and the synchronization processing message comprises information for continuing to send data until the sent data is synchronous with received multicast data;
not sending the current data stream synchronized with the multicast stream to the terminal device, when the synchronization processing message comprises information indicating that no data synchronized with the received multicast data needs to be sent; and
continuing to send the data streams of a current channel to the terminal device, when the failure case processing message comprises information for continuing to send the data streams of the current channel.

3. A channel switching server, applied to provide media service to a user terminal through unicast and multicast, comprising:
a message processing module, configured to receive a failure case message or a failure case processing message sent from a terminal device and parse the failure case message or the failure case processing message;
a sending module, configured to perform corresponding processing according to the failure case message or the failure case processing message parsed by the message processing module;
wherein the sending module is configured to stop sending current data stream to the terminal device, when the failure case message comprises information indicating that there are repeated data streams beyond a preset condition in received unicast and multicast streams; and
send the current data stream synchronized with the multicast stream to the terminal device, when the failure case message comprises information indicating that the received unicast stream is asynchronous with the currently received multicast stream after unicast streams are stopped, or no data synchronized with the currently received multicast stream needs to be sent to the terminal device.

4. A channel switching server, applied to provide media service to a user terminal through unicast and multicast, comprising:
a message processing module, configured to receive a failure case message or a failure case processing message sent from a terminal device and parse the failure case message or the failure case processing message; and
a sending module, configured to perform corresponding processing according to the failure case message or the failure case processing message parsed by the message processing module;
wherein the sending module is configured to stop sending a current data stream to the terminal device, when the failure case processing message comprises information for stopping the current data stream;
send the current data stream synchronized with multicast stream to the terminal device, when the failure case processing message comprises a synchronization processing message and the synchronization processing message comprises information for continuing to send data until the sent data is synchronous with received multicast data;
not to send the current data stream synchronized with the multicast stream to the terminal device, when information indicating that no data synchronized with the received multicast data needs to be sent; and
continue to send the data streams of a current channel to the terminal device, when the failure case processing message comprises information for continuing to send the data streams of the current channel.

* * * * *